United States Patent
Okumura et al.

(10) Patent No.: US 9,079,611 B2
(45) Date of Patent: Jul. 14, 2015

(54) STEERING APPARATUS

(71) Applicant: JTEKT CORPORATION, Osaka-shi, Osaka (JP)

(72) Inventors: Yu Okumura, Kariya (JP); Yoshihide Ohara, Okazaki (JP); Takeshi Kawara, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/024,992

(22) Filed: Sep. 12, 2013

(65) Prior Publication Data

US 2014/0076093 A1  Mar. 20, 2014

(30) Foreign Application Priority Data

Sep. 19, 2012  (JP) .................................. 2012-206020

(51) Int. Cl.
  *B62D 1/187*  (2006.01)
  *B62D 1/189*  (2006.01)
  *B62D 5/04*  (2006.01)
  *B60R 16/027*  (2006.01)

(52) U.S. Cl.
  CPC .............. *B62D 1/187* (2013.01); *B60R 16/027* (2013.01); *B62D 1/189* (2013.01); *B62D 5/04* (2013.01)

(58) Field of Classification Search
  CPC ........ B60R 16/027; B62D 1/18; B62D 1/187; B62D 1/189; B62D 5/04
  USPC .............................. 280/775, 779, 780; 74/493
  See application file for complete search history.

(56) References Cited

U.S. PATENT DOCUMENTS

2011/0163524 A1*  7/2011  Aota et al. ..................... 280/779
2012/0006142 A1*  1/2012  Jung .............................. 74/493

FOREIGN PATENT DOCUMENTS

JP  2005067340 A  *  3/2005
JP  A-2010-36734  2/2010

* cited by examiner

*Primary Examiner* — Paul N Dickson
*Assistant Examiner* — Robert A Coker
(74) *Attorney, Agent, or Firm* — Oliff PLC

(57) ABSTRACT

A steering apparatus includes a tilt hinge shaft fixed to a vehicle body, a steering column that rotationally supports the steering shaft, and a ground clamp, which is made of an elastically deformable conductive material. The ground clamp is arranged between the tilt hinge shaft and the steering column. The ground clamp includes a second arcuate section that contacts the tilt hinge shaft, a first bent section that contacts the steering column, and a deformation section that extends between the second arcuate section and the first bent section. The deformation section is elastically deformable such that the second arcuate section and the first bent section approach each other. The ground clamp is arranged between the tilt hinge shaft and the steering column with the deformation section being elastically deformed.

5 Claims, 3 Drawing Sheets

STEERING APPARATUS

BACKGROUND OF THE INVENTION

The present invention relates to a steering apparatus.

For example, Japanese Laid-Open Patent Publication No. 2010-36734 discloses a steering apparatus that includes a ground clamp. The ground clamp connects an electronic device such as a horn in the steering column to the vehicle body, thereby grounding the electronic device. Specifically, the electronic device is connected to a tilt hinge shaft fixed to the steering shaft via the ground clamp. The tilt hinge shaft is the pivot of tilting action of the steering shaft.

The ground clamp of the steering apparatus disclosed in Japanese Laid-Open Patent Publication No. 2010-36734 includes a C-shaped holding portion, which holds the tilt hinge shaft, and a spring portion, which arcuately extends from an end of the holding portion and away from the center of the holding portion, and an end portion, which is formed by folding back an end of the spring portion. The ground clamp is configured such that, with the spring portion elastically deformed, the holding portion holds the tilt hinge shaft and the end portion contacts the outer circumferential surface of the housing of the steering column. This electrically connects the steering apparatus to the vehicle body via the ground clamp. The housing of the steering column includes a receiving portion. When the steering column is tilted, the end portion of the ground clamp is moved. At this time, the receiving portion prevents the end portion and the housing from being separated from each other.

SUMMARY OF THE INVENTION

The steering apparatus of Japanese Laid-Open Patent Publication No. 2010-36734 includes the receiving portion, which is provided in the housing of the steering column. The receiving portion is designed for maintaining the contact between the steering column and the tilt hinge shaft when the steering column is tilted. Thus, each time the distance between the housing of the steering column and the tilt hinge shaft is changed, the ground clamp and the housing both need to be redesigned, which complicates design changes.

Accordingly, it is an objective of the present invention to provide a steering apparatus that includes a ground clamp, which is easily adapted for a design change.

To achieve the foregoing objective, and in accordance with one aspect of the present invention, a steering apparatus is provided, which includes a steering shaft, a tilt hinge shaft fixed to a vehicle body, a steering column that rotationally supports the steering shaft, and an elastically deformable conductive member. The steering apparatus is tiltable about the tilt hinge shaft and is electrically connected to the vehicle body by installing the conductive member between the tilt hinge shaft and the steering column. The conductive member includes a first contact section that contacts the tilt hinge shaft, a second contact section that contacts the steering column, and a deformation section that extends between the first contact section and the second contact section. The deformation section is elastically deformable such that the first contact section and the second contact section approach each other. The deformation section is constructed to be inserted between the tilt hinge shaft and the steering column, while being elastically deformed.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A steering apparatus according to one embodiment of the present invention will now be described with reference to FIGS. 1 to 4.

<Structure of Steering Apparatus>

Figure 1:
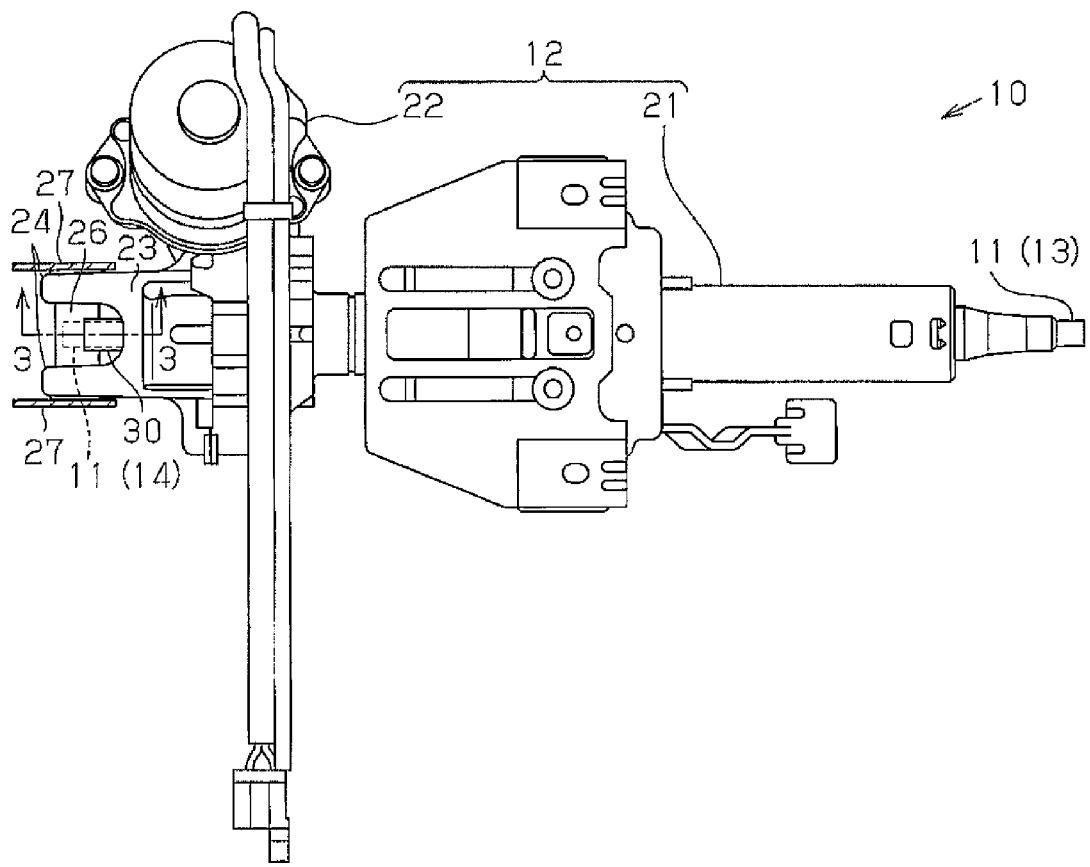
FIG. 1 is a plan view of a steering apparatus.
Figure 4:
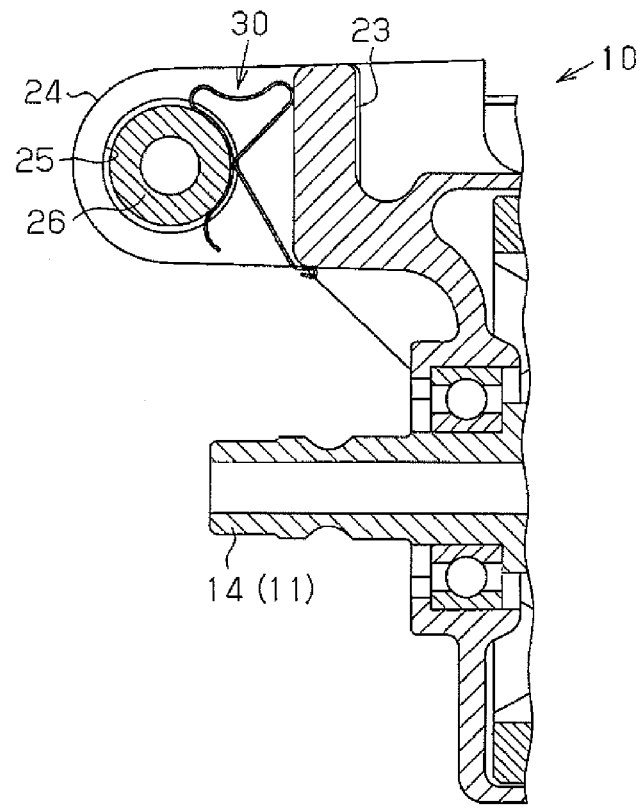
FIG. 4 is a cross-sectional view of the steering apparatus.

As shown in FIGS. 1 and 4, a steering apparatus 10 includes a steering column 12, which rotationally supports a steering shaft 11. An electronic device such as a horn (not shown) is provided in the steering column 12.

The steering column 12 includes a column tube 21, which rotationally supports an upper shaft 13 of the steering shaft 11, and a power assist unit 22, which applies assist force to a lower shaft 14 of the steering shaft 11. The power assist unit 22 includes a speed reducing mechanism, a motor, and an ECU. The column tube 21 and the power assist unit 22 are accommodated in a housing 23. The housing 23 is made of a conductive metal, and the column tube 21 and the power assist unit 22 are electrically connected to each other. The steering shaft 11, more specifically, the lower shaft 14 thereof, is coupled to an intermediate shaft via a universal joint (not shown).

Figure 3A:
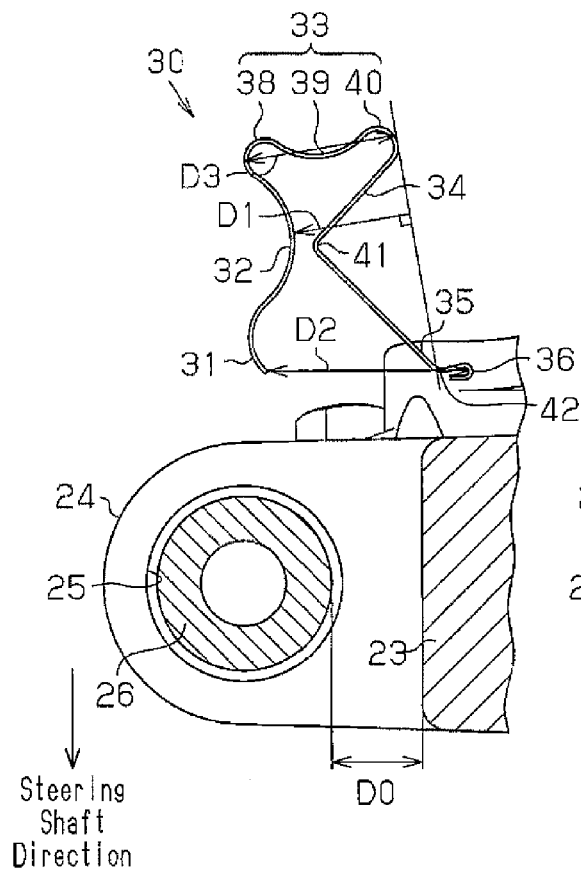
FIGS. 3A to 3D are cross-sectional views taken along line 3-3 in FIG. 1, illustrating a process through which the ground clamp is attached to the steering apparatus.
Figure 3B:
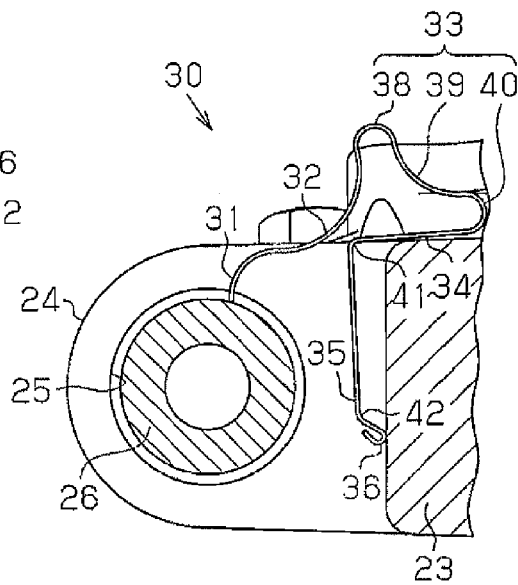

The housing 23 includes a gear housing portion, which accommodates the speed reducing mechanism. The gear housing portion has a pair of support walls 24, which extends parallel with the axis of the steering shaft 11 (the lower shaft 14). As shown in FIG. 1, the support walls 24 are arranged to sandwich the lower shaft 14 when the steering apparatus 10 is viewed from above. As shown in FIG. 3A, the support walls 24 each have a through hole 25 at the distal end. The through holes 25 are aligned with each other. The through holes 25 have the same inner diameter. The through holes 25 receive a conductive tilt hinge shaft 26. As shown in FIG. 1, a tilt hinge shaft 26 is fixed to a conductive fixing bracket 27, which extends from a vehicle body (not shown). A low-friction member made of a synthetic plastic is provided between the tilt hinge shaft 26 and the through hole 25, so that the tilt hinge shaft 26 and the support walls 24 are insulated from each other. The steering apparatus 10 can be tilted about the tilt hinge shaft 26. A ground clamp 30, which is formed of a conductive material and functions as a conductive member, is held between the tilt hinge shaft 26 and the housing 23.

<Structure of Ground Clamp>

Next, the structure of the ground clamp 30 will be described.

Figure 2:
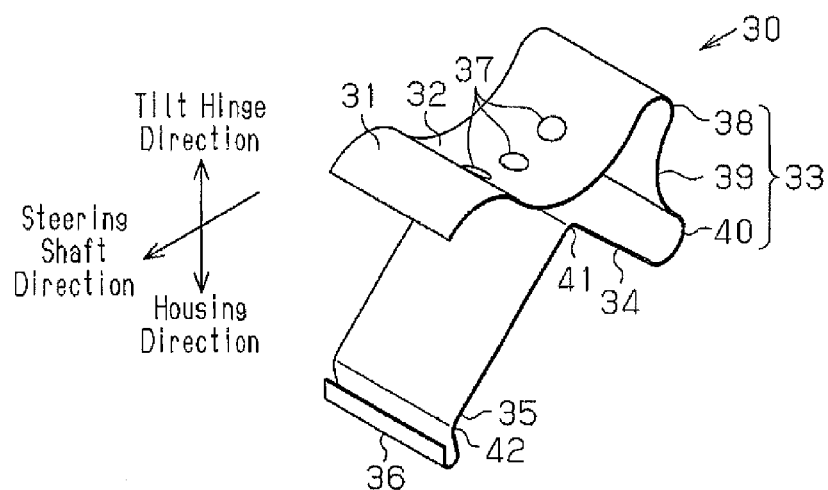
FIG. 2 is a perspective view of the ground clamp.

As shown in FIG. 2, the ground clamp 30 is formed by bending an elastically deformable conductive metal plate.

The ground clamp 30 includes a first arcuate section 31, a second arcuate section 32, which serves as a first contact section, a deformation section 33, a first bent section 34, which serves as a second contact section, a second bent section 35, and a folded-back section 36.

Figure 3C:
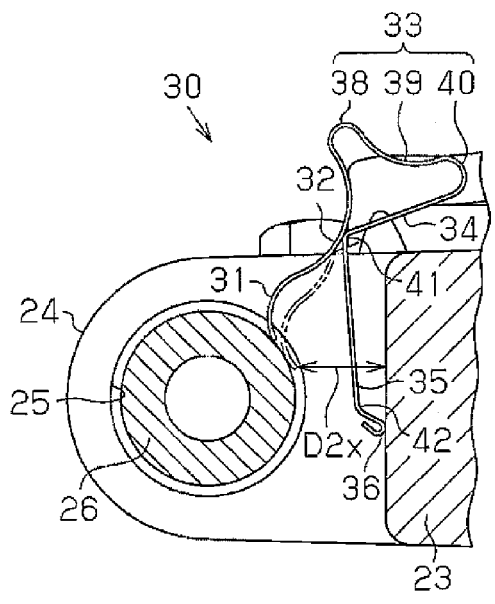
Figure 3D:
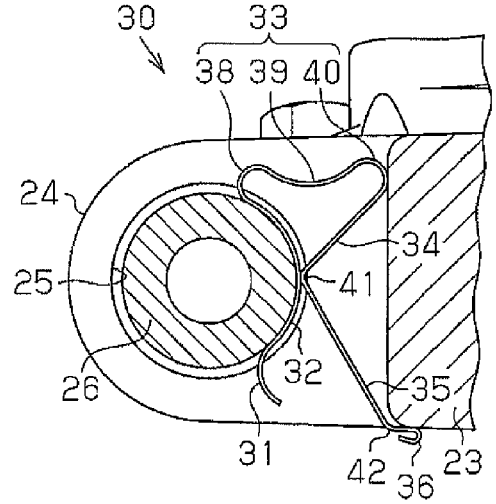

As shown in FIG. 3D, the first arcuate section 31 is arcuately curved to bulge toward the tilt hinge shaft 26.

The second arcuate section 32 extends from the first arcuate section 31 in a direction separated away from the lower shaft 14, and is curved to bulge toward the housing 23. The second arcuate section 32 is formed to extend along the outer circumferential surface of the tilt hinge shaft 26. The second arcuate section 32 has three projections 37 on a surface that faces the tilt hinge shaft 26. The projections 37 project toward the tilt hinge shaft 26. The three projections 37 are arranged on the same arc.

The deformation section 33 extends from an end of the second arcuate section 32 that is located away from the lower shaft 14. The deformation section 33 has first to third small arcuate sections 38 to 40 to be shaped as the numeral "3." The first small arcuate section 38 extends from the second arcuate section 32 and bulges away from the lower shaft 14. The second small arcuate section 39 extends from the first small arcuate section 38 and bulges toward the lower shaft 14. The third small arcuate section 40 extends from the second small arcuate section 39 and bulges away from the lower shaft 14. The second small arcuate section 39 is located closer to the housing 23 than the first small arcuate section 38, and the third small arcuate section 40 is located closer to the housing 23 than the second small arcuate section 39.

The first bent section 34 extends from a part of the deformation section 33 that is close to the housing 23, that is, from the third small arcuate section 40. The first bent section 34 extends from an end of the deformation section 33 and toward the lower shaft 14 and is bent at a first apex 41 to be L-shaped. The distance between the first bent section 34 and the second arcuate section 32 decreases from the deformation section 33 toward the first apex 41 and increases from the first apex 41 toward the lower shaft 14. That is, the first bent section 34 is bent at the first apex 41 to protrude toward the second arcuate section 32. As shown in FIG. 3A, the first apex 41 is separated from the second arcuate section 32 in a free state of the ground clamp, that is, a state of the ground clamp before being installed.

The second bent section 35, which functions as an engaging portion, extends from a part of the first bent section 34 that is close to the steering shaft 11. The second bent section 35 has an L shape, which is bent at a second apex 42 and extends away from the second arcuate section 32. The distance between the second bent section 35 and the second arcuate section 32 increases from the first bent section 34 toward the second apex 42 and abruptly increases from the second apex 42 toward the lower shaft 14. That is, the second bent section 35 is bent at the second apex 42 to protrude toward the lower shaft 14.

The folded-back section 36 extends from a part of the second bent section 35 that is away from the second arcuate section 32, and is folded back toward the second apex 42. That is, the folded-back section 36 is curved to bulge toward the housing 23.

As shown in FIG. 3A, a distance D1 to the second arcuate section 32 from a straight line connecting the third small arcuate section 40 and the second apex 42 of the second bent section 35 is set to be slightly longer than a distance D0 between the tilt hinge shaft 26 and the housing 23 (D1>D0) even when the second arcuate section 32 and the first apex 41 contact each other. Also, a distance D2 between the first arcuate section 31 and the folded-back section 36 is set to be longer than the distance D1 to the second arcuate section 32 from the straight line connecting the third small arcuate section 40 and the second apex 42 of the second bent section 35 (D2>D1>D0). Further, a distance D3 between the first small arcuate section 38 and the third small arcuate section 40 is set to be longer than the distance D1 to the second arcuate section 32 from the straight line connecting the third small arcuate section 40 and the second apex 42 of the second bent section 35 (D3>D1>D0).

<Operation of Ground Clamp>

Next, a method for installing the ground clamp 30 and operation of the ground clamp 30 installed between the tilt hinge shaft 26 and the housing 23 will be described. The ground clamp 30 is installed between the tilt hinge shaft 26 and the housing 23 by being inserted toward the steering shaft 11.

First, as shown in FIG. 3A, the ground clamp 30 is arranged at a position further away from the steering shaft 11 than the tilt hinge shaft 26 and the housing 23.

Next, as shown in FIG. 3E, the entire ground clamp 30 is moved toward the steering shaft 11 such that the folded-back section 36 slides toward the steering shaft 11 along the outer surface of the housing 23 in an area between the housing 23 and the tilt hinge shaft 26. Then, the distal end of the first arcuate section 31 contacts the tilt hinge shaft 26.

Subsequently, as shown in FIG. 3C, the deformation section 33 is elastically deformed until the first apex 41 and the second arcuate section 32 contact each other. Using as a fulcrum a part of the second arcuate section 32 that contacts the first apex 41, the second arcuate section 32 is elastically deformed such that the first arcuate section 31 approaches the folded-back section 36. Further, the first bent section 34 is elastically deformed such that the second apex 42 is separated away from the third small arcuate section 40.

The above described elastic deformations cause a distance D2x between the first arcuate section 31 and the housing 23 to be shorter than a distance D0 between the tilt hinge shaft 26 and the housing 23 (D2x<D0). This allows the ground clamp 30 to move toward the steering shaft 11. Since the first arcuate section 31 is arcuately curved to bulge toward the tilt hinge shaft 26, the distal end thereof easily enters between the tilt hinge shaft 26 and the housing 23. That is, the ground clamp 30 can be easily inserted between the tilt hinge shaft 26 and the housing 23.

When the folded-back section 36 reaches a corner of the housing 23 that is close to the steering shaft 11 as shown in FIG. 3D, the elastically deformed sections are slightly returned toward the original positions. Accordingly, the folded-back section 36 is arranged between the steering shaft 11 and a side of the housing 23 that faces the steering shaft 11, and the second bent section 35 contacts a corner of the housing 23 that is close to the steering shaft 11. In this manner, the second bent section 35 is hooked to the corner to restrict movement of the ground clamp 30 away from the steering shaft 11.

Also, using a part contacting the first apex 41 as a fulcrum, the elastically deformed second arcuate section 32 is returned to the original shape. Accordingly, the second arcuate section 32 is pressed against the outer circumferential surface of the tilt hinge shaft 26 at a position between the tilt hinge shaft 26 and the housing 23. The elastic deformations of the deformation section 33 and the first bent section 34 are maintained so that the first apex 41 and the second arcuate section 32 are kept contacting each other. That is, the ground clamp 30 receives an elastic restoring force that acts to separate the first apex 41 and the second arcuate section 32 away from each other. This causes the ground clamp 30 to be held between the tilt hinge shaft 26 and the housing 23. The first apex 41 and the second arcuate section 32 are kept contacting each other as described above, which restricts elastic deformation of the deformation section 33 that reduces the distance D3 between the first small arcuate section 38 and the third small arcuate section 40. That is, the distance D3 is prevented from being shorter than the distance D0 between the tilt hinge shaft 26 and the housing 23. This restricts movement of the ground clamp 30 toward the steering shaft 11.

As shown in FIG. 2, the second arcuate section 32, which contacts the tilt hinge shaft 26, has the three projections 37 projecting toward the tilt hinge shaft 26. The second arcuate section 32 makes point-to-point contact with the tilt hinge shaft 26 at the three the projections 37. It is known that point-to-point contact results in a higher contact pressure than surface-to-surface contact. In other words, the ground clamp 30 and the tilt hinge shaft 26 contact each other with a sufficient pressure. Also, since a sufficiently high contact pressure between the tilt hinge shaft 26 and the projections 37 is ensured, entry of foreign matter between the tilt hinge shaft 26 and the projections 37 is restricted.

As described above, the above embodiment has the following advantages.

(1) The ground clamp 30 is inserted between the tilt hinge shaft 26 and the housing 23 with the deformation section 33 kept elastically deformed. The ground clamp 30 receives an elastic restoring force that acts to separate the first apex 41 and the second arcuate section 32 away from each other. This causes the ground clamp 30 to be held between the tilt hinge shaft 26 and the housing 23. Therefore, for example, even if the distance between the tilt hinge shaft 26 and the housing 23 is changed to some extent, the ground clamp 30 can be held between the tilt hinge shaft 26 and the housing 23. If the distance between the tilt hinge shaft 26 and the housing 23 is changed to a great extent, the shape of the housing 23 does not need to be changed, but only the deformation section 33 of the ground clamp 30 needs to be changed. In this manner, the steering apparatus 10 can easily accommodate design changes.

(2) The ground clamp 30 has the second bent section 35, which is hooked to the corner of the housing 23 that is close to the steering shaft 11. This restricts movement of the ground clamp 30 away from the steering shaft 11. Accordingly, the ground clamp 30 is prevented from unexpectedly falling off between the tilt hinge shaft 26 and the housing 23.

(3) The ground clamp 30, which is formed by a plate, includes the folded-back section 36 at one end. The folded-back section 36 extends from the end of the second bent section 35 that is close to the housing 23 and is folded back toward the second apex 42. That is, the folded-back section 36 is curved to bulge toward the steering shaft 11. Since the ground clamp 30 is inserted between the tilt hinge shaft 26 and the housing 23 with the folded-back section 36 leading, the folded-back section 36 slides toward the steering shaft 11 along the outer surface of the housing 23. Therefore, the end of the ground clamp 30 does not stick on the housing 23. This allows an operator to smoothly install the ground clamp 30. Also, fingers and the like of the operator are prevented from being caught by the ground clamp.

(4) When the ground clamp 30 is inserted between the tilt hinge shaft 26 and the housing 23, the second arcuate section 32 and the first apex 41 contact each other. This prevents the deformation section 33 from being deformed beyond the elastic limit and being plastically deformed.

(5) The second arcuate section 32 has the three projections 37 projecting toward the tilt hinge shaft 26. Thus, when the ground clamp 30 is inserted between the tilt hinge shaft 26 and the housing 23, the three projections 37 make point-to-point contact with the tilt hinge shaft 26. Since point-to-point contact results in a higher contact pressure than surface-to-surface contact, foreign matter is unlikely to enter between the projections 37 and the tilt hinge shaft 26. Therefore, for example, when rain water is splashed onto the steering apparatus 10, rust is unlikely to form between the projections 37 and the tilt hinge shaft 26. This prevents the projections 37 and the tilt hinge shaft 26 from being separated from and non-conductive with each other.

The above embodiment may be modified as follows.

Figure 5:
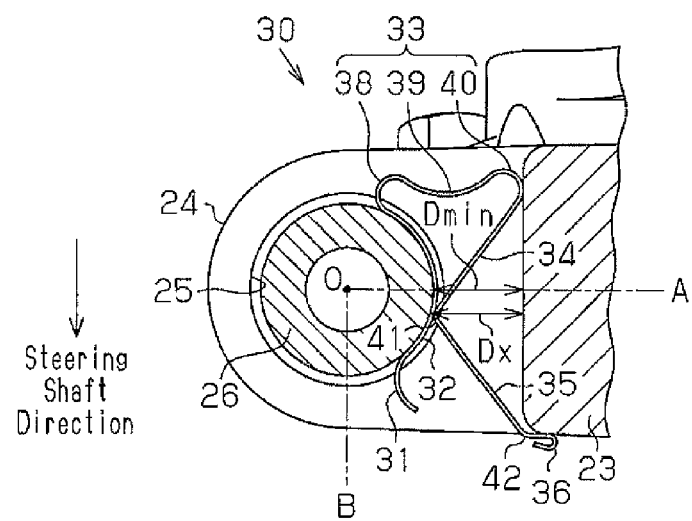
FIG. 5 is a cross-sectional view taken along line 3-3 in FIG. 1, illustrating a modification.

In the above illustrated embodiment, the second arcuate section 32 and the first apex 41 may be configured to contact each other at a position closer to the steering shaft 11 than a line segment OA from the center O of the tilt hinge shaft 26 to the housing 23 as shown in FIG. 5. On the line segment OA, the distance between the tilt hinge shaft 26 and the housing 23 is the shortest (the minimum distance Dmin). That is, in FIG. 5, the second arcuate section 32 and the first apex 41 preferably contact each other in an area defined by a line segment AOB. In this case, a distance between the housing 23 and a part of the second arcuate section 32 that contacts the first apex 41 is longer than the minimum distance Dmin between the tilt hinge shaft 26 and the housing (Dx>Dmin). Therefore, even if the second bent section 35 is disengaged from the housing 23, the ground clamp 30 is prevented from moving toward or away from the steering shaft 11. Also, even if the second arcuate section 32 is deformed toward the housing 23 with a part contacting the first apex 41 serving as a fulcrum, the ground clamp 30 is prevented from moving toward or away from the steering shaft 11. That is, with the configuration of this modification, the ground clamp 30 is more reliably held between the tilt hinge shaft 26 and the housing 23 than the above illustrated embodiment.

When the ground clamp 30 is held between the tilt hinge shaft 26 and the housing 23 in the above illustrated embodiment, the second arcuate section 32 and the first apex 41 do not necessarily need to contact each other. For example, the second arcuate section 32 and the first apex 41 may contact each other only when the second bent section 35 is disengaged from the housing 23. In this case, the same advantages as the above illustrated embodiment are achieved.

In the above illustrated embodiment, the three projections 37 are provided. However, if at least one projection 37 is provided, the same advantages as above are achieved. The projections 37 may be omitted. In the configuration without the projections 37, the ground clamp 30 is held between the tilt hinge shaft 26 and the housing 23, conduction between the tilt hinge shaft 26 and the housing 23 is ensured.

In the above illustrated embodiment, the second arcuate section 32 and the first apex 41 do not necessarily need to contact each other.

In the above illustrated embodiment, the folded-back section 36 may be omitted.

In the above illustrated embodiment, the folded-back section 36 may be provided at an end of the first arcuate section 31.

In the above illustrated embodiment, the second bent section 35, which functions as an engaging portion, may be omitted.

In the illustrated embodiment, the second contact section is formed by the first bent section 34, which includes the first apex 41. However, the second contact section does not necessary need to have the first apex 41. That is, the second contact section does not necessarily need to be bent. For example, the second contact section may be flat without being bent. Even in this case, the second contact section is allowed to contact the housing 23.

In the above illustrated embodiment, the first contact section is formed by the arcuately curved second arcuate section 32. However, the first contact section does not necessarily need to be curved arcuately. For example, the first contact section may be flat. Even in this case, the first contact section is allowed to contact the tilt hinge shaft 26.

In the above illustrated embodiment, the deformation section 33 is shaped as numeral "3" having the first to third small arcuate sections 38 to 40. However, the deformation section 33 may have any shape as long as it can be elastically deformed to cause the first contact section and the second contact section to approach each other.

In the above illustrated embodiment, the first arcuate section 31 may be omitted.

Therefore, the present examples and embodiments are to be considered as illustrative and not restrictive and the invention is not to be limited to the details given herein, but may be modified within the scope and equivalence of the appended claims.

The invention claimed is:

1. A steering apparatus comprising:
   a steering shaft;
   a tilt hinge shaft fixed to a vehicle body;
   a steering column that rotationally supports the steering shaft; and
   an elastically deformable conductive member, wherein
   the steering apparatus is tiltable about the tilt hinge shaft and is electrically connected to the vehicle body by installing the conductive member between the tilt hinge shaft and the steering column,
   the conductive member includes a first contact section that contacts the tilt hinge shaft, a second contact section that contacts the steering column, and a deformation section that extends between the first contact section and the second contact section,
   the deformation section is elastically deformable such that the first contact section and the second contact section approach each other, and the deformation section is constructed to be inserted between the tilt hinge shaft and the steering column, while being elastically deformed,
   the first contact section includes an arcuate section that is curved to bulge toward the steering column, the first contact section contacting the tilt hinge shaft within a range of the arcuate section, and
   the deformation section includes: (i) a first small arcuate section that extends from the first contact section and bulges away from the steering shaft, (ii) a second small arcuate section that extends from the first small arcuate section and bulges towards the steering shaft, and (iii) a third small arcuate section that extends from the second small arcuate section and bulges away from the steering shaft.

2. The steering apparatus according to claim 1, wherein the conductive member further includes an engaging portion, which engages with the steering column when moving away from between the tilt hinge shaft and the steering column.

3. The steering apparatus according to claim 1, wherein
   an end of at least one of the first contact section and the second contact section of the conductive member is folded back away from at least one of the tilt hinge shaft and the steering shaft to form a folded-back section, and
   the conductive member is constructed to be inserted between the tilt hinge shaft and the steering column with the folded-back section first.

4. A steering apparatus comprising:
   a steering shaft;
   a tilt hinge shaft fixed to a vehicle body;
   a steering column that rotationally supports the steering shaft; and
   an elastically deformable conductive member, wherein
   the steering apparatus is tiltable about the tilt hinge shaft and is electrically connected to the vehicle body by installing the conductive member between the tilt hinge shaft and the steering column,
   the conductive member includes a first contact section that contacts the tilt hinge shaft, a second contact section that contacts the steering column, and a deformation section that extends between the first contact section and the second contact section,
   the deformation section is constructed to be inserted between the tilt hinge shaft and the steering column, while being elastically deformed, and
   when the conductive member is arranged between the tilt hinge shaft and the steering column, the first contact section and the second contact section contact each other.

5. A steering apparatus comprising:
   a steering shaft;
   a tilt hinge shaft fixed to a vehicle body;
   a steering column that rotationally supports the steering shaft; and
   an elastically deformable conductive member, wherein
   the steering apparatus is tiltable about the tilt hinge shaft and is electrically connected to the vehicle body by installing the conductive member between the tilt hinge shaft and the steering column,
   the conductive member includes a first contact section that contacts the tilt hinge shaft, a second contact section that contacts the steering column, and a deformation section that extends between the first contact section and the second contact section,
   the deformation section is constructed to be inserted between the tilt hinge shaft and the steering column, while being elastically deformed, and
   when the conductive member is inserted between the tilt hinge shaft and the steering column, the first contact section and the second contact section contact each other.

* * * * *